(12) United States Patent
Relyea et al.

(10) Patent No.: US 7,496,828 B2
(45) Date of Patent: Feb. 24, 2009

(54) METHOD AND SYSTEM FOR MAPPING TAGS TO CLASSES USING NAMESPACES

(75) Inventors: Robert A. Relyea, Belleuve, WA (US); Jeffrey L. Bogdan, Redmond, WA (US); Peter F. Ostertag, Woodinville, WA (US); Michael J. Hillberg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

(21) Appl. No.: 11/049,527

(22) Filed: Feb. 1, 2005

(65) Prior Publication Data
US 2005/0132279 A1 Jun. 16, 2005

Related U.S. Application Data

(63) Continuation of application No. 10/715,709, filed on Nov. 18, 2003.

(51) Int. Cl.
*G06N 3/00* (2006.01)
(52) U.S. Cl. ...................................... 715/200
(58) Field of Classification Search ................. 715/500, 715/513, 517, 523, 530, 234, 243, 254, 255, 715/200
See application file for complete search history.

(56) References Cited

U.S. PATENT DOCUMENTS

2002/0065110 A1* 5/2002 Enns et al. .................. 455/566
2004/0103199 A1* 5/2004 Chao et al. .................. 709/228
2004/0268237 A1* 12/2004 Jones et al. ................. 715/513

OTHER PUBLICATIONS

Bray, Tim, "XML Namespaces by Example," Jan. 1999, <http://www.xml.com/pub/a/1999/01/namespaces.html>, pp. 1-3.*
"Namespaces in XML," Jan. 14, 1999, <http://www.w3.org/TR/1999/REC-xml-names-19990114/>, pp. 1-12.*
"XML Namespace," http://en.wikipedia.org/wiki/Xml_namespace, pp. 1-2.*
"CSS Namespace Enhancements," <http://www.w3.org/1999/06/25/WD-css3-namespace-19990625/> W3C, Jun. 25, 1999.*

* cited by examiner

*Primary Examiner*—Stephen S Hong
*Assistant Examiner*—Kyle Stork
(74) *Attorney, Agent, or Firm*—Merchant & Gould; Ryan T. Grace (57) ABSTRACT

A method and system for mapping a tag in a markup language (ML) document to a class using namespaces is described. A parser in a computing system analyzes the tag in the ML document. A definition file location attribute related to the tag is referenced in the ML document. A definition file associated with definition file location attribute is retrieved. A namespace related to the tag is referenced within the definition file to determine the class associated with the tag. The class is located in an assembly such that the tag is mapped to the class.

15 Claims, 5 Drawing Sheets

```
                                          ┌─500
        http://schemas.microsoft.com/2003/xaml/xmlns.definition
            <XmlNamespace Name="Microsoft Xaml 2003">
510 ─<Schema Uri="http://microsoft.com/2003/xaml/xaml2003.xsd" />
520 ─<Assembly Name="PresentationFramework" Version="1.0" >
            <Namespace Name="System.Windows.Controls" />
            <Namespace Name="System.Windows.Controls.Primitives" />
            <Namespace Name="System.Windows.Documents" />
            <Namespace Name="System.Windows.Shapes" />
540 ─<Namespace Name="System.Windows.Media.Animation" />
            <Namespace Name="System.Windows.Data" />
        </Assembly>
        <Assembly Name="PresentationCore" Version="1.0">
            <Namespace Name="System.Windows.Media" />
        </Assembly>
530 ─<Installation Uri="http://microsoft.com/2003/xaml/Install.htm" />
        </Xmlns>
```

```
                                            500 http://schemas.microsoft.com/2003/xaml/xmlns.definition

<XmlNamespace Name="Microsoft Xaml 2003">

510  <Schema Uri="http://microsoft.com/2003/xaml/xaml2003.xsd" />

520  <Assembly Name="PresentationFramework" Version="1.0" >

<Namespace Name="System.Windows.Controls" />

<Namespace Name="System.Windows.Controls.Primitives" />

<Namespace Name="System.Windows.Documents" />

<Namespace Name="System.Windows.Shapes" />

540  <Namespace Name="System.Windows.Media.Animation" />

<Namespace Name="System.Windows.Data" />

</Assembly>

<Assembly Name="PresentationCore" Version="1.0">

<Namespace Name="System.Windows.Media" />

</Assembly>

530  <Installation Uri="http://microsoft.com/2003/xaml/Install.htm" />

</Xmlns>
```

*Fig. 5*

METHOD AND SYSTEM FOR MAPPING TAGS TO CLASSES USING NAMESPACES

REFERENCE TO RELATED APPLICATION

This application is a continuation of the application Ser. No. 10/715,709, filed on Nov. 18, 2003, which application is incorporated herein by reference.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of an XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

The XML standard is considered by many to be the ASCII format of the future, due to its expected pervasiveness throughout the hi-tech industry in the coming years. Recently, some word-processors have begun producing documents that are somewhat XML compatible. For example, some documents may be parsed using an application that understands XML.

Another type of markup language is considered an extension of XML is Extensible Application Markup Language (XAML). XAML is often used to produce documents with relation to the document's user interface.

Developers have traditionally used imperative programming for developing software, rather than a declarative definition of a hierarchy of objects. A markup definition of a hierarchy of objects is commonly specified with properties and events wired to programmatic code, which raises the level of abstraction for developers. What is needed is a new type of file that can describe the definition of the hierarchy of objects in a readable format.

SUMMARY OF THE INVENTION

The present invention is directed at a method and system for mapping a tag in a markup language (ML) document to a class and attributes to properties on that class using namespaces. A parser in a computing system analyzes the tag in the ML document. A definition file location attribute related to the tag is referenced in the ML document. A definition file associated with definition file location attribute is retrieved. A namespace related to the tag is referenced within the definition file to determine the class associated with the tag. The class is located in an assembly such that the tag is mapped to the class.

DETAILED DESCRIPTION OF THE PREFERRED EMBODIMENT

Briefly stated, the present invention is directed to a method and system for mapping a tag in a ML document to a class and attributes to properties on that class using namespaces. A parser in a computing system analyzes the tag in the ML document. A definition file location attribute related to the tag is referenced in the ML document. A definition file associated with definition file location attribute is retrieved. A namespace related to the tag is referenced within the definition file to determine the class associated with the tag. The class is located in an assembly such that the tag is mapped to the class.

Throughout the specification and claims, the following terms take the meanings explicitly associated herein, unless the context clearly dictates otherwise.

The term "markup language" refers to a language for special codes within a document that specify how parts of the document are to be interpreted by an application. For example, in a word-processor file, markup elements may be associated with particular formatting that specifies how the content of the element is to be displayed or laid out. In other documents, such as other ML documents, the markup may be directed to describing data without addressing display considerations.

The term "element" refers to the basic unit of an ML document. The element may contain attributes, other elements, content, and other building blocks for an ML document.

The term "tag" refers to a command inserted in a document that delineates elements within an ML document. Each element usually has no more than two tags: the start tag and the end tag. It is possible to have an empty element (with no content) in which case one tag is allowed.

The term "class" refers to a template or object factory such as object-oriented programming associated with the element. Elements typically map to one class; tags may not map to any classes. Classes are used to associate additional information with an element that is not included in the element's content.

The term "namespace" refers to a unique identifier for a collection of names that are used in ML documents as element types and attribute names. Namespaces also apply to the underlying DotNet technology of markup language which is independent of ML. The name of a namespace is commonly used to uniquely identify each class of ML document. The unique namespaces differentiate markup elements that come from different sources and happen to have the same name.

The examples in the following detailed description are written in XAML, however, the present invention is equally applicable to other markup languages.

Illustrative Operating Environment

Figure 1:
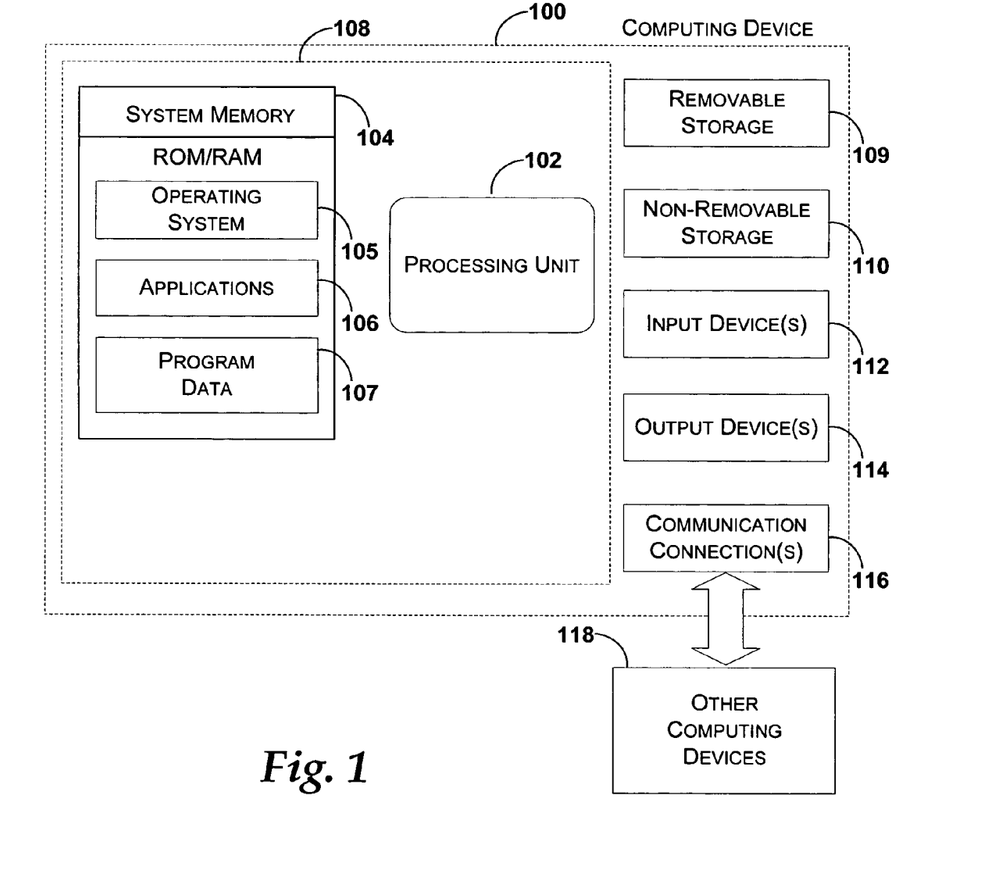
FIG. 1 shows an exemplary computing environment in which this invention may be implemented.

With reference to FIG. 1, one exemplary system for implementing the invention includes a computing device, such as computing device 100. A basic configuration includes those components within dashed line 108. In the basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Mapping Tags to Classes with Namespaces

Figure 2:
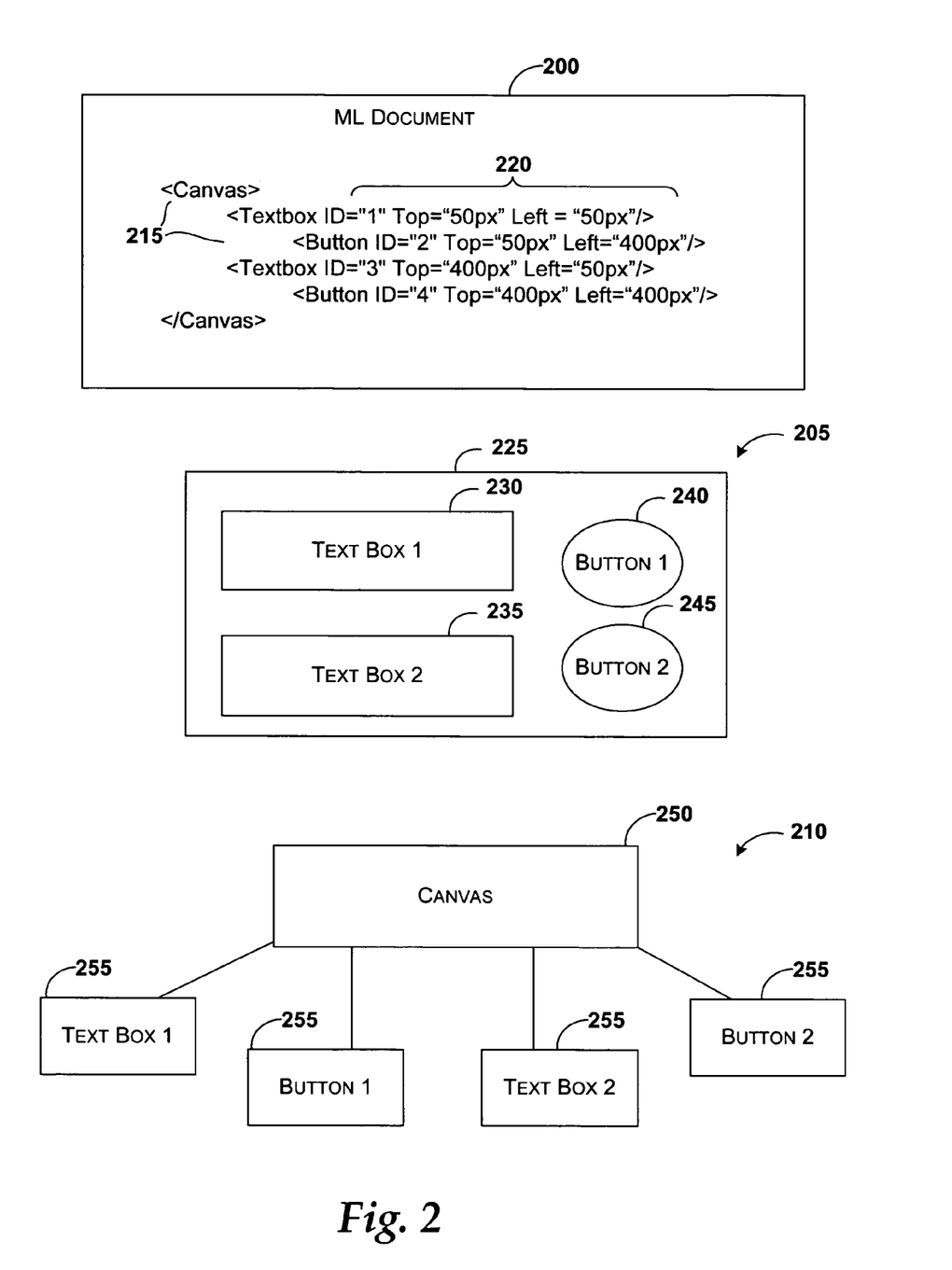
FIG. 2 illustrates a markup language document, a graphic display of a function associated with the ML document, and a corresponding object hierarchy tree in accordance with the present invention.

FIG. 2 illustrates ML document 200, graphic display 205 resulting from the execution of an application associated with ML document 200, and a corresponding object tree 210. ML document 200 can include elements such as a namespace (not shown), tags 215, and set properties 220. For example, ML document 200 can be processed to produce a user interface including canvas 225 with two text boxes 230, 235 and two buttons 240, 245.

Object tree 210 is created when ML document 200 is parsed. Object tree 210 includes primary object 250 that corresponds to an upper level tag (e.g., the canvas), and secondary objects 255 that correspond to lower level tags (e.g., text box and button). Each object 250, 255 includes any associated set properties (e.g., top, left, etc.).

Defining a namespace establishes the namespace for all the tags in an ML document. The example language below illustrates how a new namespace can be defined using a prefix. In this example, the namespace prefix is defined as "foo."

```
<Hello xmlns: foo="name namespace" xmlns="default namespace">
    <Bar.../>
    <foo: Bar.../>
</Hello>
```

The parser maps "default namespace" into a set of defined CLR namespaces. The parser then searches the CLR namespaces for "Hello." "Bar" is resolved in "name namespace" which maps to a CLR namespace and an assembly.

In accordance with one embodiment, a list of common language runtime (CLR) namespaces is hard-coded to the assemblies where "name namespaces" are stored. The parser uses one XML namespace to automatically map to CLR namespaces and assemblies. One assembly definition is supported for each namespace. In accordance with another embodiment, the parser searches for a definition file (e.g., xmlns definition file) in the location specified by a definition file location attribute.

For example, given the following definition file location attribute:

xmlns=http://schemas.microsoft.com/2003/xaml, the parser could search for the definition file at a related location, such as: http://schemas.microsoft.com/2003/xaml/xmlns.definition. Alternatively, the parser could locate the definition file using a central namespace registry system.

Figure 3:
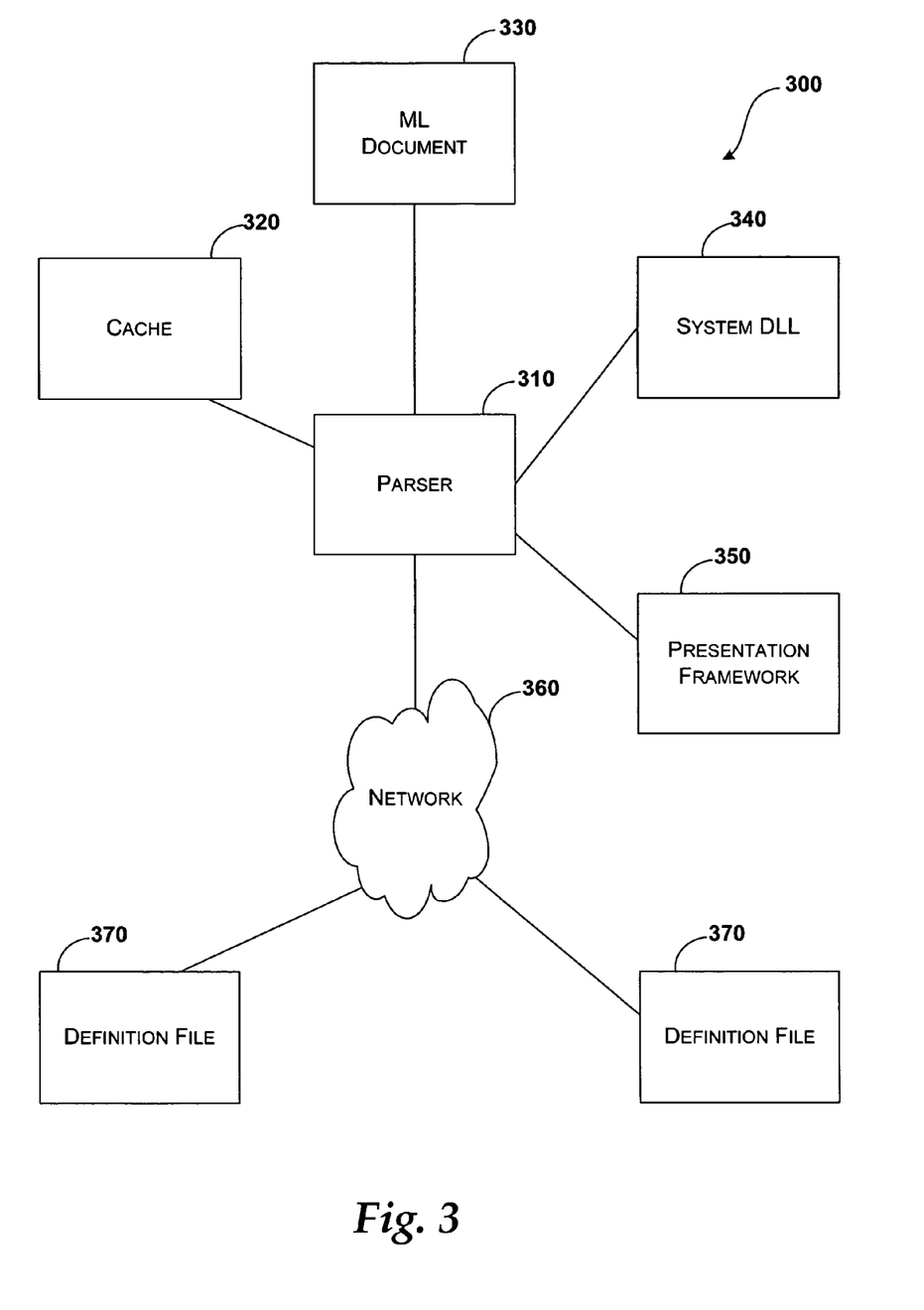
FIG. 3 illustrates an exemplary functional block diagram for mapping tags to classes using namespaces in accordance with the present invention.

FIG. 3 illustrates a functional block diagram of a system 300 for mapping tags to classes using namespaces in an ML document. System 300 includes parser 310, cache 320, ML document 330, system dynamic link library 340, presentation framework 350, network 360, and definition files 370. Parser 310 is logically coupled to cache 320, ML document 330, system dynamic link library 340, presentation framework 350, and network 360. Definition files 370 are logically coupled to network 360.

Parser 310 is an application that dissects source code. Cache 320 is part of the system memory and typically comprises static RAM. ML document 330 can be any document created using a markup language (e.g., XAML). ML document 330 includes at least one namespace.

System dynamic link library 340 and presentation framework 350 are both examples of assemblies that are available to use when parsing ML document 330. These assemblies are often dynamic link libraries that are databases of executable functions or data that can be used by an application. Typically, a dynamic link library provides one or more particular functions and a program accesses the functions by creating a link to the library. In one embodiment, system dynamic link library 340 and presentation framework 350 contain classes of functions associated with the namespaces of ML document 330. System dynamic link library 340 includes functions of the classes associated with the operating system of the computing device. Presentation framework 350 includes functions of the classes associated with input and output devices of the computing devices. For example, presentation framework 350 includes functions associated with generating and editing a user interface.

Network 360 allows the computing device to communicate with other computing devices or other storage devices within the computing device. For example, network 360 can be a local area network, a wide area network, or the world wide web. Definition files 370 include data associated with a namespace. The data associated with the namespace can include a definition file location attribute. In one embodiment, definition files 370 are located on network 360.

Figure 4:
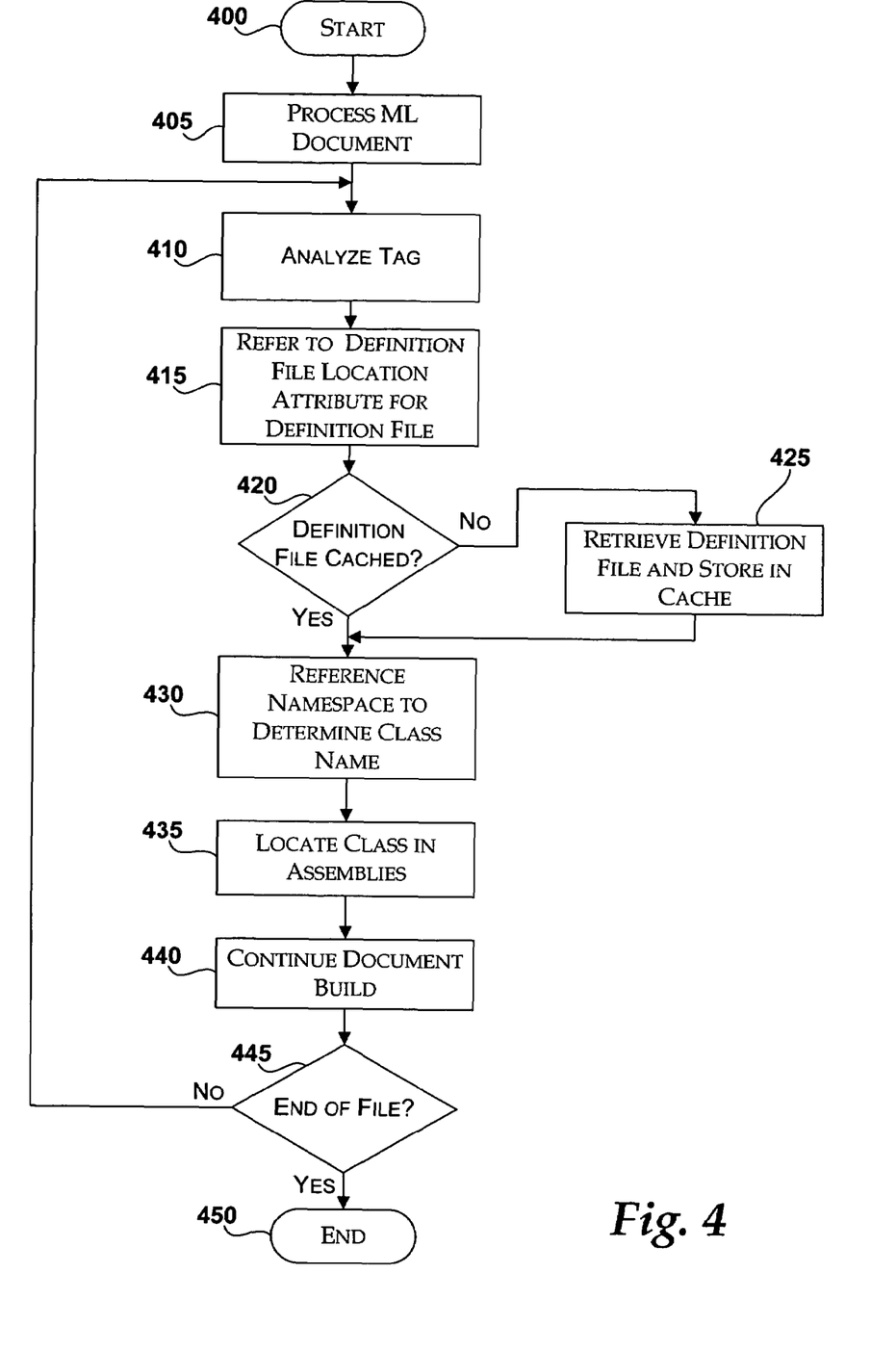
FIG. 4 is an operational flow diagram illustrating a process for mapping tags to classes using namespaces in accordance with the present invention.

The process for mapping ML tags to classes using namespaces is described with reference to FIG. 4. The process begins at block 400 where an ML document (e.g., 330) has been generated that includes tags and definition file location attributes with associated namespaces.

At block 405, the parser processes the ML document. The ML document is processed to build the resulting document that is generated from the markup of the ML document. For example, as described above, a user interface document that includes text boxes and buttons with specified functionality may be produced from the ML document. As the parser processes the ML document, processing moves to block 410.

At block 410, the parser analyzes a tag. The tags are analyzed in linear order as listed in the ML document. In one example, as each tag is read, so is the reference (i.e., prefix) for its associated namespace. For example, in the following tag "<bk:para>" the "para" element is explicitly identified as being in the namespace identified by the "bk" prefix, which is defined earlier in the ML document. In other examples, a prefix may not be included with the tags. When no prefix is associated with the namespace, the defined namespace may be associated with all tags. Also, in another embodiment, the namespaces of a definition file may be associated with the tags. As each tag is examined and its namespace prefix determined by the parser, then processing moves to block 415.

At block 415, the parser refers to the definition file location attribute associated with the namespace to identify the definition file. As discussed above, the parser looks for the definition file in the location specified by the definition file location attribute. An example of a definition file location attribute that may be located in the ML file is:

xmlns="http://schemas.Microsoft.com/2003/xaml"

For the above example, the parser searches the definition file located at: http://schemas.Microsoft.com/2003/xaml/xmlns.definition. Once the definition file location attribute has been examined to identify the definition file and its location, processing proceeds to decision block 420.

At decision block 420, a determination is made whether the definition file is available locally in the cache. The definition file may be found in cache if the associated namespace was previously encountered by the parser. If a corresponding definition file is found in the cache, the process flows to block 430. However, if the definition file is not found in the cache, the process continues at block 425.

At block 425, the parser retrieves and stores the definition file in the cache. In one embodiment, as discussed above the definition file is located at the location identified by the definition file location attribute. In another embodiment, a separate location is associated with the definition file location attribute and the parser is redirected to retrieve the definition file from the separate location. As the definition file is retrieved, it is stored in the cache for reference. Processing continues at block 430.

At block 430, the parser references the namespaces listed in the definition file to determine the class associated with the tag. XML namespaces can be mapped into a combination of a DotNet namespace and an assembly. An exemplary definition file (500) is described in connection with FIG. 5 below. The CLR namespaces are listed in the definition file. The parser references each namespace in linear order to determine the associated class of the tag being analyzed. Each namespace included in the definition file has listed classes that are associated with that namespace. When the correct class for the tag being analyzed is determined, processing moves to block 435.

At block 435, the parser locates the appropriate class in the assemblies. As shown in the exemplary definition file (500) of FIG. 5, the definition file includes a listing of assemblies with functions associated with the classes. The classes, after having been identified according to the namespace, are then located in the assemblies. As a result, the tags of the ML document have been associated with the correct class within the assemblies. Processing then moves to block 440.

At block 440, the parser continues the build of the ML document. The build processes that follow the mapping of the ML document tag to the appropriate class are known in the art and are not described in detail herein. Processing continues at decision block 445.

At decision block 445, a determination is made whether the parser has reached the end of the ML document. If the end of the ML document has not been reached, processing returns to block 410 where a new tag is analyzed in the ML document. If the end of the ML document has been reached, processing advances to block 355 where the process ends.

In one embodiment, the above-described process can also be used when using namespaces on properties in an ML document. The following is an example of using a namespace on a property in an XAML document.

```
<TextPanel xmlns="http://schemas.microsoft.com/2003/xaml"
    xmlns:other="MyAssembly#MyNamespace"
    xmlns:def="Definition" >
        <Button ID="button1" Click="clicked"
        other:Tooltip.Text="Hover Text">Press this</Button>
        <other:CoolButton CoolEffect="FlyIn">Watch
        this</other:CoolButton>
        <Text ID="text1">Waiting for click</Text>
</TextPanel>
```

In the above example, a XML namespace prefix "other" is defined. The prefix maps to the "MyAssembly" assembly. The CLR namespace "MyNamespace" is found in "MyAssembly," and the class "Tooltip" is found in "MyNamespace." In a further embodiment, the process step of first checking the cache for the definition file may not be included in the present invention. In such an instance, the parser is required to retrieve the definition file for each tag to relate the tag to its corresponding class.

Figure 5:
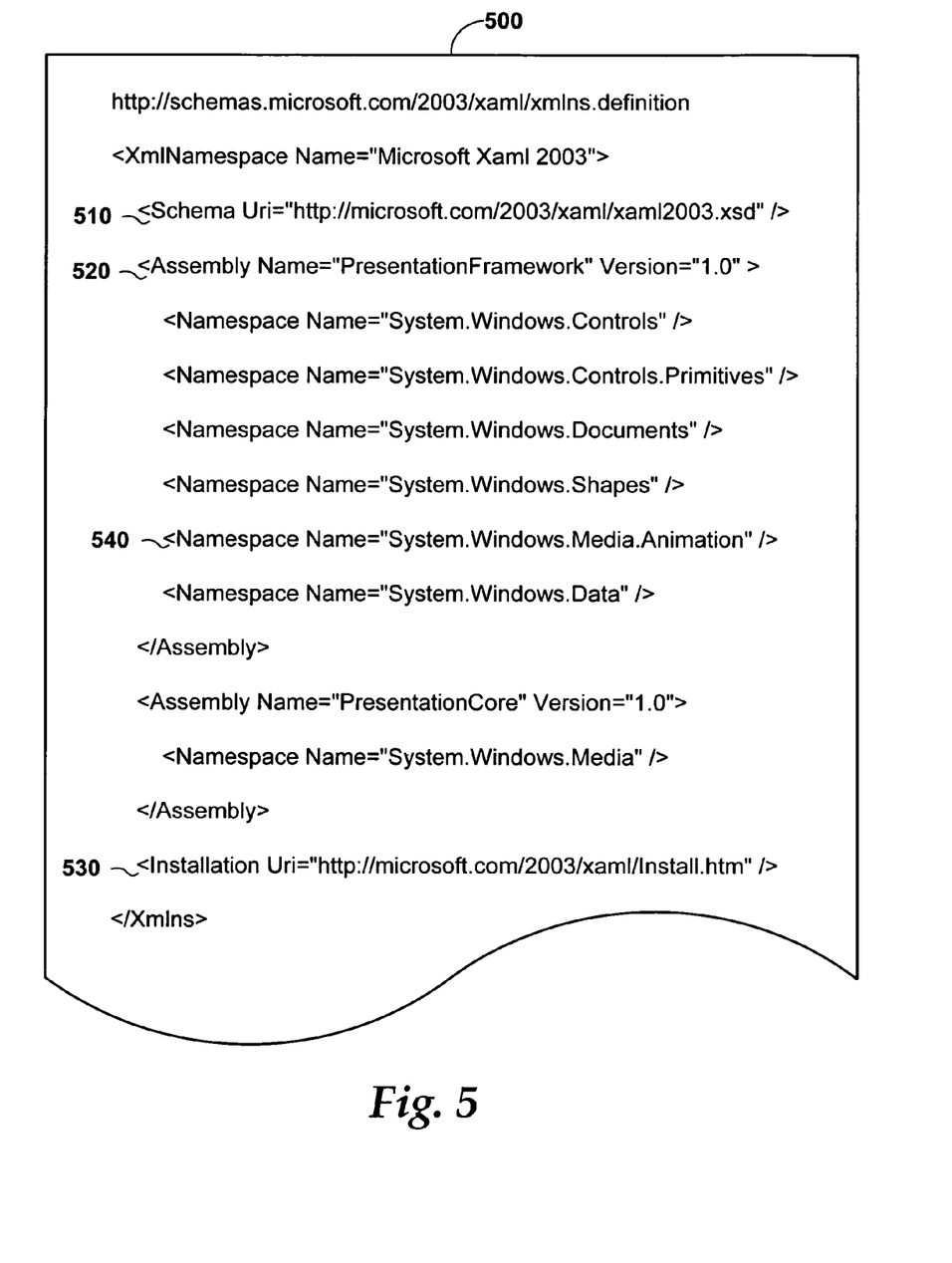
FIG. 5 illustrates an example of contents of a definition file in accordance with the present invention.

FIG. 5 illustrates an example of contents of definition file 500. Definition file 500 provides the list of namespaces, schema, and assemblies associated with a particular ML file that references the definition file. Definition file 500 can define such elements as schema 510, assemblies 520, and tags 530. Schema 510 limits the scope of attributes in definition file 500. In one embodiment, definition file 500 is searched in the order specified by the listing of assemblies 520 and namespaces 540. As illustrated, namespaces 540 are associated with the particular assemblies 520 listed in definition file 500. Namespaces 540 can include DotNet namespaces. In one embodiment, classes (not shown) are also associated with namespaces 540.

Installation tag 530 directs the user to a uniform resource identifier (URI) location to install assemblies 520. In one embodiment, assemblies 520 are installed automatically using the software necessary to interpret the namespace. Alternatively, assemblies 520 are not installed automatically. In one embodiment, subplatforms provide users with a step through process for installation. The user can be navigated to the URI in the namespace to provide an overview page that links to installation instructions, documentation, schema, and the like.

A user can install a definition file by listing the user's assembly and the appropriate namespaces before pre-existing assemblies and namespaces. This eliminates the need to search beyond the newly installed assemblies because the parser may stop searching after the namespace is resolved in the first listed assembly. Previously, a compiler error would result when the same class in the same namespace is found in more than one assembly. Alternatively, the parser may continue searching after the namespace is resolved but redundant class names should be avoided when building an assembly set.

Mapping processing instruction (PI) may be useful in situations where it is not desirable to have the namespace definition at a default namespace location. For example, Mapping PI is useful for custom components that are built into an assembly or for third party build components that are distributed with an application. The parser can map the element name specified in the ML document to the appropriate class in the correct assembly.

Mapping PI maps a CLR namespace and an assembly to an XML namespace. A separate mapping exists from the XML namespace to a namespace prefix. When an element name is qualified with a namespace prefix, the parser locates the XML namespace with the namespace prefix. The parser identifies the mapping PI using the XML namespace. The mapping PI is used to determine the DotNet class that corresponds to the element name. In the Mapping PI example below, the CLR namespace and assembly name "acme" are provided.

<?Mapping XmlNamespace="foo"
ClrNamespace="ACME.Widgets"
Assembly="acme"?>

For a namespace that points to a URI that is beyond the user's control (e.g., w3.org) the following implementation is provided.

```
<?Mapping XmlNamespace = "http://www.w3.org/2000/svg"
XmlnsDefinition
= "http://acme.com/2000/svg/xmlns.definition"?>
    <?Mapping XmlNamespace="ACME"
    ClrNamespace="ACME.Widgets"
Assembly="acme"?>
    <DockPanel
xmlns="http://schemas.microsoft.com/2003/xaml/"xmlns:acme="ACME">
        <acme:Widget Name="Widget1"/>
        <acme:Gadget Name="Gadget1"/>
    </DockPanel>
```

For a given "svg" document that is used with Adobe Illustrator®, a definition of components is searched for at the specified web location. In the example provided, an "svg" implementation is built at acme.com. When the "svg" document is loaded, the defined components are used thereby allowing use of Adobe Illustrator®. The mapping PI is placed in the "svg" document. A definition file cannot be stored at www.w3.org since the site is not user-owned.

An industry standard and some specific tools exist for creating "svg" documents. For a given namespace, the corresponding implementation (e.g., set of assemblies, namespaces, etc.) is searched for at the acme.com location. This allows the ML file output of a program with "svg" content to share the same namespace. Instead, three different implementations might be desired. Mapping PI allows a user to choose the desired implementation. Every time the namespace is encountered the implementation can be obtained at the specified location.

The process of mapping a tag or an attribute to a CLR class uses a combination of the namespace of a tag and the definition file for the namespace. The correct class can be located by mapping. The parser determines which class the tag refers to. The mapping process can be implemented using the following example.

```
<?Mapping XmlNamespace="foo" ClrNamespace="MS.Word"
Assembly="MSWord.exe" />
    <DockPanel
xmlns="http://schemas.microsoft.com/2003/xaml/"xmlns:other="foo">
        <TextBox />
        <other:Button />
    </DockPanel>
```

The CLR namespace is "MS.Word." The assembly is "MSWord.exe." The elements of the resulting tree include "DockPanel", "TextBox", and "Button."

The parser searches for "DockPanel" and "TextBox" in the assemblies and CLR namespaces defined in the definition file, which is located at http://schemas.microsoft.com/2003/xaml/. "DockPanel" and "TextBox" are located inside the schema, i.e., the presentation framework assembly in the System.Windows.Controls namespace. The parser searches for "Button" in the "MsWord.exe" assembly. "Button" is located inside "MSWord.exe" in the "MS.Word" namespace.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for mapping a tag in a markup language (ML) document to a class using namespaces, comprising:

analyzing a tag in the ML document, wherein the tag identifies a definition file location attribute in the ML document;

retrieving a definition file from a location specified by the definition file location attribute, wherein the definition file includes:

a schema that limits the scope of attributes in the definition file, a list of assemblies that reference the definition file, a list of common language runtime namespaces for each assembly of the list of assemblies referenced in the definition file, wherein each common language runtime namespace includes a list of classes associated with the common language runtime namespace, and an installation tag that includes a uniform resource identifier for installing the assemblies of the list of assemblies;

referencing the list of common language runtime namespaces of the retrieved definition file to determine a common language runtime class associated with the tag;

locating the determined common language runtime class in the assembly of the retrieved definition file;

accessing code of the assembly of the determined common language runtime class via the uniform resource locator of the installation tag;

installing the assembly of the determined common language runtime class; and building the ML document with the tag mapped to the common language runtime class of the assembly of the retrieved definition file.

2. The method of claim 1, wherein analyzing a tag further comprises analyzing the tags in linear order as listed in the ML document.

3. The method of claim 1, wherein analyzing a tag further comprises reading a prefix corresponding to the namespace related to the tag.

4. The method of claim 3, wherein the prefix is defined in the ML document.

5. The method of claim 1, further comprising determining whether the definition file is available locally in a cache, and if not available, storing the retrieved definition file in the cache.

6. The method of claim 1, wherein retrieving a definition file further comprises retrieving the definition file from a network location specified by the definition file location attribute.

7. The method of claim 1, wherein determining a common language runtime class associated with the tag further comprises locating the common language runtime class in a dynamic link library, the dynamic link library comprising classes of functions associated with the common language runtime namespace.

8. The method of claim 1, further comprising generating the ML document, the ML document comprising the tag and the definition file location attribute.

9. The method of claim 1, wherein the common language runtime namespace of the definition file is associated with a property within an element of the ML document.

10. A method of communicating between a client process and a server process in a distributed processing system, comprising the steps of:

issuing, by the client process, a call to map a tag in an ML document to a common language runtime class, wherein the ML document includes a definition file location attribute that is associated with the tag;

receiving, by the server process, the call and retrieving a definition file associated with the definition file location attribute, wherein the definition file includes:

a list of assemblies that reference the definition file, a list of common language runtime namespaces for each assembly of the list of assemblies referenced in the definition file, wherein each common language runtime namespace includes a list of classes associated with the common language runtime namespace, and an installation tag that includes a uniform resource identifier for installing the assemblies of the list of assemblies;

referencing the list of common language runtime namespaces of the retrieved definition file to determine a common language runtime class associated with the tag;

locating the determined common language runtime class in the assembly of the retrieved definition file;

accessing code of the assembly of the determined common language runtime class via the uniform resource locator of the installation tag;

installing the assembly of the determined common language runtime class; and building the ML document with the tag mapped to the common language runtime class of the assembly of the retrieved definition file.

11. The method of claim 10, wherein the client process further comprises determining whether the definition file is available locally in a cache, and if not available, storing the retrieved definition file in the cache.

12. The method of claim 10, wherein the server process further comprises retrieving the definition file from a network location specified by the definition file location attribute.

13. The method of claim 10, wherein the server process further comprises locating the common language runtime class in a dynamic link library, the dynamic link library comprising classes of functions associated with the common language runtime namespace.

14. A computer readable storage medium having computer executable instructions for mapping a tag in a markup language (ML) document to a class using namespaces, comprising:

analyzing a tag in the ML document, wherein the tag identifies a definition file location attribute in the ML document;

retrieving a definition file from a location specified by the definition file location attribute, wherein the definition file includes:

a list of assemblies that reference the definition file, a list of common language runtime namespaces for each assembly of the list of assemblies referenced in the definition file, wherein each common language runtime namespace includes a list of classes associated with the common language runtime namespace, and an installation tag that includes a uniform resource identifier for installing the assemblies of the list of assemblies;

referencing the list of common language runtime namespaces of the retrieved definition file to determine a common language runtime class associated with the tag;

locating the determined common language runtime class in the assembly of the retrieved definition file;

accessing code of the assembly of the determined common language runtime class via the uniform resource locator of the installation tag;

installing the assembly of the determined common language runtime class; and building the ML document with the tag mapped to the common language runtime class of the assembly of the retrieved definition file.

15. The computer-readable storage medium of claim 14, wherein retrieving a definition file further comprises retrieving the definition file from a network location specified by the definition file location attribute.

* * * * *